June 3, 1941. P. S. BEAR Re. 21,815

SWITCH

Original Filed April 11, 1936 2 Sheets-Sheet 1

Inventors:
Paul S. Bear,

By Brown Jackson Boettcher & Dienner
Attys

SWITCH

Original Filed April 11, 1936 2 Sheets-Sheet 2

Inventors.
Paul S. Bear,

By Brown Jackson & Boettcher Wenner

Attys.

Reissued June 3, 1941 Re. 21,815

UNITED STATES PATENT OFFICE 21,815

SWITCH

Paul S. Bear, Elkhart, Ind., assignor, by mesne assignments, to Bucklen-Bear Laboratories, Inc., Elkhart, Ind., a corporation of Indiana Original No. 2,132,922, dated October 11, 1938, Serial No. 73,883, April 11, 1936. Application for reissue July 20, 1939, Serial No. 285,561

33 Claims. (Cl. 200—152)

This invention relates to switches, and more particularly is directed to switches of the metal envelope type employing mercury as the contactor between spaced metallic electrodes.

In my prior copending application, Serial No. 745,842, September 28, 1934, I have disclosed a switch construction employing a cup-shaped metal shell of stainless steel or the like, having an enlarged open end receiving a refractory or ceramic member sealed in the end of the shell and supporting a second electrode in spaced relation to the shell. The present invention constitutes a modification in the design and assembly of such type of mercury switches for imparting to such switches improved operating characteristics.

I have found that a mercury switch can be provided having greatly improved operating characteristics by treatment of the mercury itself, as described in the copending application of myself and Herbert E. Bucklen, Serial No. 67,816, filed March 9, 1936. With this improved mercury contacting body, and the employment of a liquid alkaline fill, such as triethanolamine, a switch can be produced which is capable of carrying relatively high current, and which can give consistent repeat performance by reason of the retention of a stable body of mercury in contact with the second electrode. Reference is made to my copending application Serial No. 53,146, filed December 6, 1935, for a full disclosure of these features.

The present invention, in its preferred form, is directed to the provision of a metal envelope type of switch having an internal construction such that a greatly increased area of contact between the two contacting bodies of mercury, or between a moving body of mercury and a stationary electrode, is produced, whereby the capacity of the switch is increased to an extent not hitherto possible in switches of this type. This is accomplished by providing a polygonal-shaped envelope with a ceramic insert having a planar runway across which the moving body of mercury moves into and out of contact with a retained stable body of mercury which is in contact with the electrode. The stable body of mercury lies in a straight line along a sharp cutting edge and presents an area of contact which is considerably increased over that provided with the usual cylindrical type of metal switch. In effect, I obtain a straight line advancing edge of mercury and retain a straight line contacting surface of mercury whereby a greater cross-section of mercury comes into simultaneous contact, as distinguished from the substantially point contact that occurs when two curved surfaces are brought into contact.

Also, heretofore, when the switch was slowly tilted toward circuit closing position, considerable frying and sputtering of the contact surfaces occurred as they moved into engagement. With the present construction, a slow motion closing of the circuit is possible without these attendant disadvantages, and the capacity of the switch is considerably increased without any danger of such frying or sputtering. Even on lamp loads, where the closing arc is excessive, tending to produce overheating of the interior of the switch, the present design of switch takes care of such loads easily without any material heating, and operates under such loads at temperatures only slightly above the adjacent room temperature.

The mounting of the ceramic insert in the switch envelope as disclosed in the present construction is such that no portion of the ceramic is placed under tension, the sealing gasket and the support of the ceramic in the metal envelope being such that the ceramic is subject only to compressions stresses. This materially lessens any danger of cracking of the ceramic during operation of the switch when internal pressures may be developed due to heating or the like.

Another feature of the present invention is the positioning of the ceramic in thermal contact with the metal envelope, whereby any heating of the ceramic will be dissipated by radiation from the external surface of the envelope. This materially increases the capacity of the switch to high currents, since the heat generated upon making and breaking of contact in a high capacity switch is thus readily dissipated externally of the switch. In this connection, I employ a refractory material that is thermally conductive, so that no localized heating of any portion of the ceramic is possible. The use of a limited alkaline liquid fill is also instrumental in affording dissipation of heat to all portions of the switch envelope.

The ceramic employed in the present switch is designed in such manner as to provide a relatively long leakage path between the central electrode supported in the ceramic and the surrounding wall of the metal envelope, thereby eliminating any tendency of shorting the circuit between the electrode and the envelope across the ceramic externally of the switch chamber. By the use of the present construction, producing the elongated leakage path, I also provide for the resilient gasket which seals the ceramic in position in the envelope to engage the ceramic in such manner as to subject the same to compression, so that any internal pressures developed in the throat of the ceramic serve only in overcoming this compression stress, and no not place any tension upon any portion of the ceramic.

The present construction is also advantageous in that the diameters of the electrode supported in the ceramic and of the retaining ring which is employed to compress the gasket during the assembly of the switch prevent any shear stresses being placed upon the fiber members enclosing the outer face of the ceramic. This prevents, to a large extent, any danger of the internal pressure being such as to force the electrode axially outwardly of the switch envelope, since the intermediate gasket means between the outer face of the electrode and the compression ring will be subjected to stresses other than straight shearing stress, and consequently have a much greater resistance to such movement of the electrode.

My invention also contemplates the provision of a switch assembly having a novel type of contact lug retaining washer, the entire assembly being capable of being enclosed within a molded case formed of a phenol condensation product or the like, and capable of adjustment so that the leads may be brought out at the same point in the case, or at points disposed in any angular relation, as desired.

A still further advantage secured by the present invention is the provision of a construction such that maximum contact area is provided between the retained body of mercury and the surface of the electrode, whereby the resistance to current passage between the mercury and the electrode is reduced, so that a sufficient area of contact is provided to prevent any overheating at this portion of the switch.

I also contemplate, in the present switch construction, the enclosing of the switch within a water jacket or the like, whereby the switch may operate under heavy loads and any heating which may occur will be readily carried away by the circulating water in direct contact with the external surface of the metallic envelope.

I also provide a metal envelope having two diameters, whereby the enlarged portion of the envelope is adapted to receive the ceramic insert and the sealing means, while the smaller portion of the envelope is used to carry the moving body of mercury, and forms the other electrode. By the use of this construction, I provide for adequate sealing and closing means, with sufficient electrical clearance between the stud and the shell, and yet produce economy in the amount of mercury which must be employed in the switch, as well as keeping the size and weight of the switch at a minimum.

Other objects and advantages of the present invention will appear more fully from the following detailed description, which, taken in conjunction with the accompanying drawings, will disclose to those skilled in the art the preferred construction and operation of the present invention.

Figure 1:
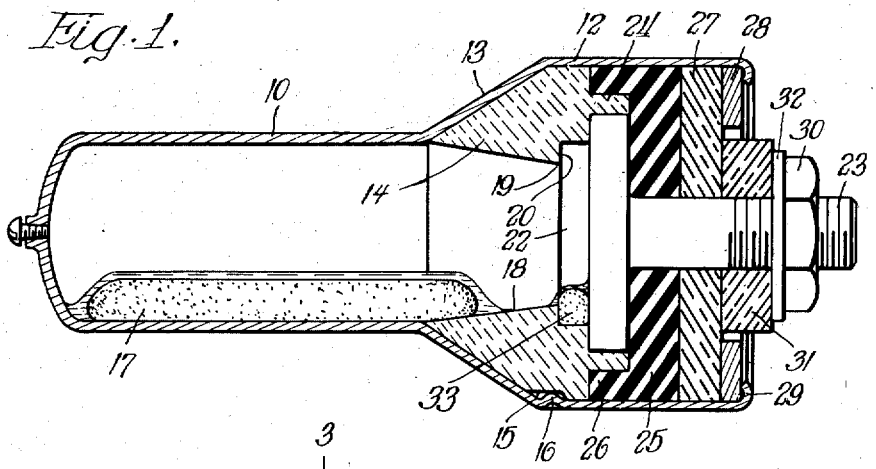
Figure 1 is a vertical sectional view through a switch embodying the principles of the present invention.

Referring now in detail to the switch shown in Figure 1, I provide a cup-shaped metallic envelope 10 having the enlarged cylindrical portion 12 jointed to the main portion of the envelope by the frusto-conical section 13. A suitable ceramic insert 14, preferably formed of porcelain, and having an outer defining surface conforming to the internal surface of the portion 13 of the envelope, is inserted into position, its position being determined with respect to the portion 10 of the envelope by means of the aligning groove 15 formed in the ceramic insert and engaging over the struck up boss 16 in the envelope.

The portion 10 of the envelope is preferably square in section, although it may be of any desired polygonal shape, and contains the moving body of mercury 17, which mercury may be cleaned and treated in the manner disclosed in my above mentioned copending application. The ceramic 14 is provided with an inclined frusto-pyramidical opening 18, terminating at the smaller end in a sharp cutting edge 19 defined by the walls 20 which extend normal to the axis of the ceramic. A suitable electrode 22, which is in the shape of a circular disc member and which is provided with the extending stud portion 23, is spaced outwardly of the walls 20 and closes the outer end of the opening 18.

The ceramic 14 is provided with an axially extending annular flange 24 within which the electrode 22 is seated, and a suitable cup-shaped resilient gasket 25, which may be formed of synthetic rubber or the like, is disposed about the extending portion 23 of the electrode and has the annular flange portion 26 disposed about the flange 24 of the ceramic and in engagement with the internal surface of the portion 12 of the envelope. The gasket is compressed against the internal surface of the portion 12 of the envelope and against the external surface of the flange 24 by means of the fiber washer 27 which is carried about the stud 23 and which engages the rear face of the gasket 25. The washer 27 is urged inwardly by means of the compression ring 28, formed of any suitable material, which is moved inwardly by beading over the end 29 of the portion 12 of the envelope. This beading or spinning over of the end 29 compresses the gasket 25 in position to seal the space between the external surface of the ceramic and the internal surface of the portion 12 of the envelope, and to also seal any clearances which may be provided between the internal surface of the flange 24 and the stud 22.

It will be noted that the leakage path between the portion 12 of the envelope and the electrode 22 is increased by this construction, and thus the danger of shorting the switch by a short circuit flash-over between the stud 22 and the portion 12 of the envelope is substantially eliminated.

The stud portion 23 of the electrode 22 is provided with a suitable nut 30 threaded thereon, which engages a washer 32 that serves to compress the washer 27 against the gasket 25. If desired, a suitable insulating spacing bushing 31 may be provided to position the washer and nut out of a possible flash-over position with respect to the compression ring and edge of the envelope.

I preferably form the ceramic 14 of porcelain, in that porcelain is a thermal conductor having a conductivity rating which, while not as good as iron, is in close proximity thereto. Furthermore, porcelain is free from metallic oxides that give off free oxygen in areas subjected to an electric arc, and therefore the use of a porcelain ceramic insures that no impurities will be introduced into the interior of the switch envelope which might prove deleterious to switch operation. Certain ceramics, such as those known commercially as "Alsimag" and "Isolantite," while perfectly adapted for use as far as mechanical fitting of parts is concerned, are not desirable in a switch of this construction, since they are relatively poor thermal conductors, that is, excellent thermal insulators. This means that when an arc is impinged upon a given point repeatedly in a ceramic of this latter type, the heat builds up at that point and is not conducted away to any other portion of the ceramic. As this heat approaches a given point, the metallic oxides in this type of ceramic are reduced, and the oxygen attacks the mercury and the unreduced particles that spall off are floated on top of the mercury, or form an emulsion with the triethanolamine. Continued usage of ceramics of this type erodes a channel through the dam forming the retaining recess until the retaining recess no longer is capable of retaining any mercury. On the other hand, porcelain, being a good thermal conductor, no localized points of heating will build up, since the porcelain will rapidly conduct the heat away from the localized point of heat generation to all portions of the ceramic, and this ceramic being in thermal contact with the metal envelope surrounding the same, the heat will be readily dissipated to adjacent portions of the switch. Also, it is to be noted that porcelain has a smaller thermal expansion than iron. Consequently, during operation of a switch in which the porcelain is disposed in direct contact with the iron, any development of heat will result in expansion of the surrounding iron away from the porcelain. This allows fluid under pressure to enter the space between the ceramic and the surrounding iron envelope, consequently balancing the pressures upon opposite sides of the ceramic so that no tension stresses are produced which might tend to crack the porcelain.

I find that ample sealing is secured by employing a gasket having only a relatively short skirt or flange 26, which seals the outer face of the porcelain and yet does not confine any heating of the porcelain so that dissipation is eliminated. It is desirable that any heat generated due to arcing within the switch be dissipated as rapidly as possible through the porcelain to the enclosing metallic envelope.

By the use of a polygonal shaped envelope in which the body of mercury 17 is capable of moving, I provide for a substantially straight line advancing edge of the mercury as it moves upwardly over the inclined planar surface 18. Similarly, the use of a square opening in the ceramic permits the retained body of mercury 33 in the recess formed between the wall 20 and the face of the electrode 22 to be also maintained in a straight line. Thus, the meeting edges of the two bodies of mercury produce a straight line contact across the entire width of the opening. This materially increases the cross-sectional area of mercury which comes into contact, thereby allowing a much heavier current to be passed through the contacting surfaces. The capacity of the switch is thereby materially increased.

The rectangular pocket formed between the electrode 22 and the walls 20 in the construction shown in Figure 1 retains a body of mercury which is of a width such as to have inherent stability. The advantages of the retention on such a stable body of mercury whose meniscus rises above the sharp cutting edge over which contact is made and broken have been pointed out in detail in my copending application, Serial No. 53,146, filed December 6, 1935.

I have found that by changing from a cylindrical form of switch to the polygonal envelope type of switch, an increase in effective contact area, when the envelope type is of a diagonal dimension substantially equal to the diameter of the cylindrical type, is employed, is increased approximately 300% over the area provided in a cylindrical type of switch of the same external dimension. This means that a material reduction in the heating caused by the arcing produced at the contact is effected, and also, currents of much greater capacity can be handled by a switch of this present construction.

Figure 2:
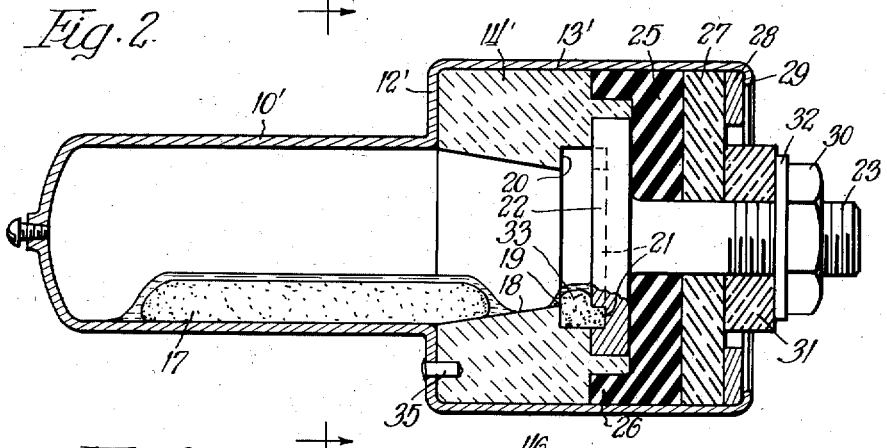
Figure 2 is a vertical sectional view through a modified form of switch.

Referring now in detail to the construction shown in Figure 2, this figure discloses a modified form of switch in which the metal envelope 10' is provided with a normally extending shoulder 12' and the cylindrical portion 13', the square shoulder 12' serving as an abutment for limiting the inward movement of the ceramic 14'. The remaining details of the construction are substantially as described in connection with Figure 1, the ceramic 14' being provided with a square type of opening 18 having planar inclined runway surfaces, the ceramic 14' being aligned with respect to the square portion 10' of the envelope by means of the aligning pin 35 engaging in a suitable recess formed in the ceramic 14'. Similar reference numerals have been employed to indicate similar parts of the construction.

Figure 3:
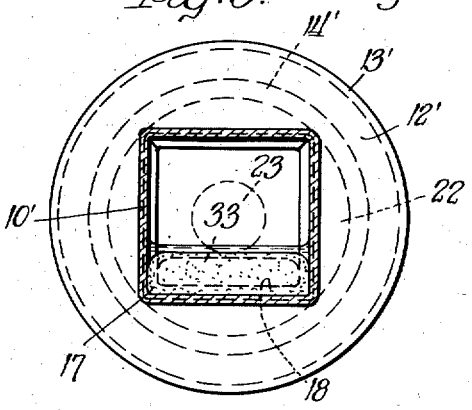
Figure 3 is a sectional view taken substantially on line 3—3 of Figure 2.

As will be apparent from the structure shown in Figure 3, the body of mercury 17 moves up the planar inclined surface 18 into contact with the retained body of mercury 33 retained in the rectangular groove formed between the face of the electrode 22 and the wall 20 defining the sharp cutting edge 19 at the inner end of the inclined surface 18. The entire width of the surface 18 is therefore occupied by the advancing edge of the body of mercury 17, and the entire width of the cutting edge 19 is also contacted by the retained body of mercury 33. Consequently, as the moving body 17 moves into engagement with the body 33, two straight line contact surfaces are provided which materially increase the contact area or cross section of mercury coming into simultaneous contact. This serves to reduce the resistance to making and breaking of the circuit, and at the same time provides sufficient mercury so that a much greater current can be controlled by the switch.

Figure 7:
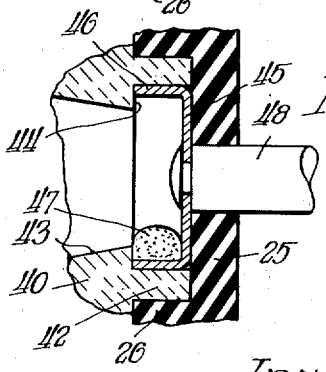
Figure 7 is a modified form of electrode construction.

I have found that if the depth of the groove in which the retained mercury 33 is disposed is not of a predetermined dimension, overheating will occur due to the relatively small contact area between the retained body of mercury 33 and the surface of the electrode 22 with which the mercury is in contact. In order to prevent any such overheating and to insure that sufficient metal to mercury contact is provided for all currents which may be handled by the switch, I have provided a construction such as shown in Figure 7 in which the ceramic 40 is provided with the rearwardly extending annular flange 42 defining with the inclined planar surface 43 a square shaped groove extending about an annular groove 44. Within this annular groove 44 I dispose a cup-shaped electrode 45 having the cylindrical flange portion 46 lying in and determining the outer periphery of the groove. Disposed within the groove 44, and retained between the inner face of the electrode 45 and the inner defining wall of the groove is a body of mercury 47 which has a substantially increased contact area in engagement with the surface of the electrode 45. Consequently, the mercury to electrode contact area is increased to an extent such that no overheating can occur because of the passage of higher current of the body of mercury 47 to the electrode 45. The electrode 45 is provided with a stud 48 extending rearwardly therefrom, and the usual resilient gasket 25 having the extending flange portion 26 is provided for sealing the ceramic in position.

It is believed obvious that the form of the electrode 45 may be varied to a considerable degree without departing from the underlying principle of providing an increased contact area between the retained body of mercury and the engaged face of the electrode. An electrode of the type such as shown at 22 may, for example, be provided with a polygonal recess 21 cut into the face thereof at a point disposed adjacent the retained body of mercury 33, so that a portion of this mercury is capable of entering the groove to increase the contact area of mercury with the metal of the electrode.

Figure 4:
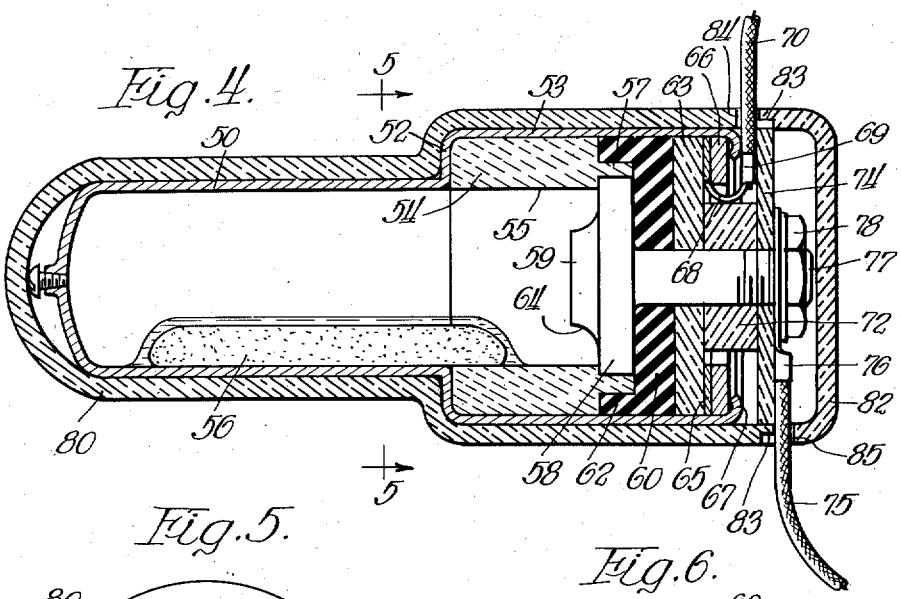
Figure 4 shows the mounting of a switch embodying the principles of the present invention within a molded case.
Figure 5:
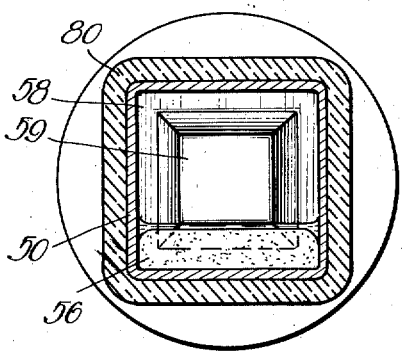
Figure 5 is a sectional view taken substantially on line 5—5 of Figure 4.
Figure 6:
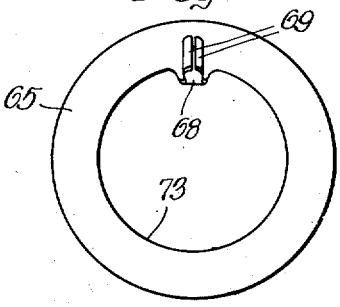
Figure 6 is an elevational view of the contact lug retaining washer shown in Figure 4.

Considering now in detail the structure shown in Figures 4, 5 and 6, I provide a metal envelope having the square section 50, having the normally extending annular shoulder portion 52 and the enlarged cylindrical portion 53 within which is disposed a ceramic insert 54 having a square opening therein indicated at 55 which extends substantially flush with the level of the floor surface of the envelope 50 upon which the body of mercury 56 is disposed. The ceramic 54 is provided with an annular flange portion 57 which receives the electrode 58, this electrode having a square head portion of reduced size indicated at 59 and shown in detail in Figure 5.

A resilient gasket 60 having the short skirt portion 62 engaging about the annular flange 57 is pressed into position by the compression washer 63 which is urged inwardly against the rear face of the gasket 60. This seals the ceramic 54 with respect to the internal surface of the shell 53, and also seals the electrode 58 with respect to the flange 57 to provide a relatively long leakage path between the electrode 58 and the interior surface of the shell portion 53.

The reduced portion 59 of the electrode 58 is provided with curved surfaces 64 which are in the form of meniscus curves, and provides for full surface contact of the advancing straight edge of the body of mercury 56 along the horizontal portion of the curved surface 64 in order to insure that the greatest cross sectional area of mercury will come into contact with the electrode upon closing of the circuit.

A suitable contact lug retaining washer indicated at 65 in Figure 6 is provided for disposition against the outer face of the compression washer 63, and is held in position by the compression ring 66 formed of metal or the like, which is held in position by the spun-over end 67 of the portion 53 of the metal envelope. The contact lug retaining washer 65 is provided with a struck out tongue portion 68, which has a pair of curved formable finger portions 69 adapted to receive and engage the end of a conductor lead 70. A spacing bushing 72 is disposed within the opening 73 formed in the member 65, and serves to space a second insulating washer member 74 from the spun-over end of the envelope, in order to insulate the lead 70 from the other conductor lead 75 which is connected to a suitable lug 76 carried by the stud portion 77 of the electrode 58, the lug 76 being held in position by the clamping nut 78.

In the embodiment of the invention disclosed, the leads 70 and 75 come out from opposite sides of the switch, but it is obvious that, due to the provision of the insulating washer 74, the leads 70 and 75 can both come out at the same point in the periphery of the switch, if desired.

The metallic switch envelope is enclosed in a suitable molded phenol condensation product casing 80 which is molded to form and fits rather snugly over the portion 50 of the envelope, and the portion 53 thereof, extending to a point disposed approximately in the plane of the insulating washer 74. An end cap or mating closure member 82 is provided which extends over the end of the stud 77 and encloses the contact lug 76 having a tongue and groove engagement indicated at 83 with respect to the portion 80 of the enclosing casing, whereby the two casings may be cemented together. Each of the casings is provided with corresponding openings 84 and 85, which serve as lead outs for the conductors 70 and 75, respectively. It is obvious that if the two conductor leads are to be led out from the same portion of the casing, the closure member 82 will be rotated 180 degrees from the position shown in Figure 4, whereupon the opening 85 will be aligned with the opening 84 and the conductors 70 and 75 will be led out from the same side of the casing, being spaced by the insulating washer member 74.

The operation of the switch shown in Figure 4 is similar to that shown in the other figures, except that a mercury to metal contact is provided instead of the mercury to mercury contact provided in the previous switch embodiment. It is, of course, obvious that the insulating enclosing cover formed by the members 80 and 82 can be equally well applied to the switches shown in Figures 1 and 2, and will function in the same manner with respect to these switches as described in connection with Figure 4. In such cases, the contact lug retaining washer 65 and the insulating bushing 72 will be applied to the stud in order to provide for connection of the conductors thereto.

Figure 8:
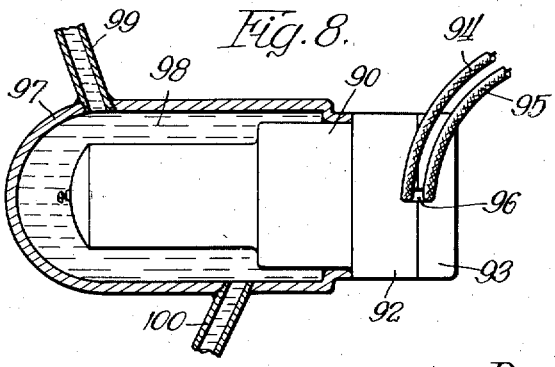
Figure 8 shows a switch of the present invention embodied in a water jacket heat dissipating construction.

Considering now in detail Figure 8, I have disclosed in this figure a switch member 90, provided with the insulating molded cover comprising the two sections 92 and 93 corresponding to the members 80 and 82 of Figure 4. In this embodiment of the invention, however, the two conductor leads 94 and 95 are brought out at the same side of the housing through the aligned openings 96. The switch of the disclosure shown in Figure 8 is provided with a jacket member 97 which fits over the enlarged surface of the metallic envelope of the switch, the casing 92 being cut away for this purpose, and provides an annular space 98 about the reduced portion of the switch envelope, which portion 98 is adapted to contain a cooling liquid, such as water or the like, introduced through the conduit 99 and exhausted through the outlet 100 whereby this water may circulate over the reduced portion of the switch 90 in order to dissipate heat therefrom.

It is therefore believed that I have provided a switch construction which is capable of making and breaking currents of considerably greater capacity than in any previously designed switch of this type and which is capable of operating with a minimum of heating, since the contact area is increased to an extent such that a considerably greater cross sectional area of mercury comes into simultaneous contact upon making of the circuit, as compared to the point-to-point contact ordinarily produced by rounded or curved surfaces.

Also, by the use of a ceramic refractory which is heat conductive, and which has good thermal contact with the metal envelope, I prevent any localized overheating of any portion of the switch, since the ceramic will conduct away the heat of localized arcs to the switch envelope. Other features of my invention, such as the relatively long leakage path between the electrode and the metal shell, and the disposition of the ceramic in the shell in such manner that the sealing means applies only compressive stresses thereto, and no internal stresses upon the ceramic are set up, are believed to provide a switch having greatly improved operating characteristics.

While I am aware that various changes may be made both in the arrangement of parts and design of the structure disclosed, I do not intend to limit myself to the specific details shown and described, and my invention is to be understood as limited only by the spirit and scope of the appended claims.

I claim:

1. A mercury switch of the class described having a pair of spaced electrodes, one of said electrodes having a planar face portion, a recess having a transversely extending body of mercury in contact with said one electrode, a body of mercury in contact with said other electrode and movable normally to said face portion of said first electrode and a planar inclined floor leading from said other electrode to said recess, said last named body of mercury being movable along said floor toward said first electrode upon tilting of said switch with a straight line advancing edge extending parallel to said face portion and moving into simultaneous full length contact with said transversely extending body of mercury.

2. A mercury switch of the class described having a cup-shaped metal envelope, a ceramic insert and an electrode extending normal to the axis of said envelope and supported solely by said insert, a body of mercury in contact with said envelope, a body of mercury extending parallel to one face of said electrode in contact therewith, and a planar runway formed in said insert between said bodies of mercury and a recess at one end of said runway retaining said second body of mercury against movement and in transverse position across the full width of said runway whereby said bodies of mercury make and break contact between parallel faces extending substantially the full width of said runway.

3. A mercury switch comprising a square metal envelope having an enlarged cylindrical end portion joined thereto by a frusto-conical section, a ceramic insert in said enlarged portion having a frusto-pyramidal recess extending axially thereof, a disc-shaped electrode closing the small end of said recess and spaced therefrom to define therewith a peripheral rectangular groove, a body of mercury retained in the lower side of said groove and having the meniscus thereof projecting above the edge of said recess for the full width of the small end of said recess, and a second body of mercury in contact with said envelope and movable along the lower side of said recess into and out of contact engagement with said first body of mercury.

4. A mercury switch comprising a square metallic envelope having an enlarged cylindrical end, a thermally conductive refractory in said end in thermal contact with the interior of said enlarged end, an axially extending flange on the outer end of said refractory spaced radially inwardly of the end of said envelope, an electrode supported within said flange, resilient sealing means engaging the outer radial face of said flange and electrode and having a peripheral flange portion disposed between said flange and the inner surface of said enlarged end of said envelope, a frusto-pyramidal recess in said refractory having its small end spaced from said electrode by an inwardly opening groove, a body of mercury retained in said groove and presenting a contact surface extending parallel to the face of said electrode, and a body of mercury in said envelope movable along one surface of said recess and having an advancing edge parallel to the contact surface of said first body of mercury.

5. A switch comprising a metal envelope having an enlarged open end portion, a ceramic in contact with the internal surface of said end portion and having an axially extending flange at the outer end thereof spaced inwardly of said surface, a disc-shaped electrode seated within said flange, and resilient sealing means engaging the outer radial surface of said electrode and said flange and having a peripheral axially extending flange disposed between the ceramic flange and the internal surface of said end portion.

6. A switch comprising a metallic envelope, a thermally conductive ceramic in one end of said envelope having thermal contact about its annular peripheral surface with the internal surface of said envelope, an electrode supported solely by said ceramic and insulated thereby from said envelope, a body of mercury retained in contact with said electrode, a frusto-pyramidal recess in said ceramic extending outwardly from said retained body of mercury to the interior of said envelope, and a body of mercury in said envelope movable along a defining surface of said recess into and out of contact with said retained body of mercury.

7. A switch comprising a metallic envelope having an enlarged cylindrical end portion, a ceramic insert therein having an axially extending annular flange spaced radially inwardly of the interior of said enlarged portion of said envelope, an electrode disc seated within said flange whereby the leakage distance from said disc to said envelope includes at least two surfaces of said flange and the radial distance from said flange to the interior of said enlarged end of said envelope, and resilient sealing means enclosing the outer face of said electrode and flange and having a peripheral flange portion disposed between said ceramic flange and the interior of said envelope.

8. A switch comprising a metallic envelope, a ceramic in one end of said envelope having thermal contact about its peripheral surface with the interior of said envelope, an electrode carried by said ceramic and radially insulated thereby, and resilient sealing means comprising a disc-like member having a peripheral flange disposed about the radially insulated part of said electrode.

9. In combination, a switch comprising a metallic envelope, a disc-shaped electrode disposed in insulated position in one end of said envelope and extending transversely across said envelope, a planar insulating runway between said electrode and the interior surface of said envelope, and a body of mercury movable along said runway upon tilting of the envelope toward said electrode and having a straight line advancing edge extending transversely across said runway normal to the direction of movement of said mercury.

10. A switch comprising a metal envelope having a ceramic insert seated in one end thereof, said insert carrying at its outer end an electrode radially insulated thereby from said envelope, resilient sealing means closing the insert end of said envelope about said electrode and radially overlapping said one end of said insert, and means for axially compressing said sealing means in position whereby said insert is entirely under compressive stress.

11. The combination, in a metal envelope switch having a square envelope section and an enlarged cylindrical end portion, of a ceramic disposed in said enlarged end portion having an axially extending outwardly projecting flange, an annular shoulder spaced radially inwardly of said flange, and a frusto-pyramidal recess extending from the inner end of said ceramic toward said shoulder and having its small end terminating radially inwardly of said shoulder and spaced axially inwardly thereof.

12. A ceramic insert for a mercury switch of the class described comprising a thermal conductive refractory having an axially extending frusto-pyramidal recess in one end thereof terminating inwardly of said end in a rectangular radial groove of a depth and width such as to retain a stable body of mercury therein, said groove having the side away from said recess defined by the planar face of an electrode supported entirely in the opposite end of said ceramic.

13. In combination, a metal envelope switch of the class described having a ceramic insert in one end thereof, sealing means for the outer end of said insert, a compression ring engaged by the spun over end of said envelope for pressing said sealing means against said insert, a contact lug washer held in position by said ring and in electrical engagement with said envelope, an electrode carried by said insert, a conductor connected to said washer, a conductor connected to said electrode, and a spacing insulator between said conductors and carried by said electrode.

14. In combination, a metal envelope mercury switch having a ceramic insert in one end thereof, compression means for holding said insert in position including a terminal lug washer in electrical engagement with said envelope, an electrode carried by said insert and having an axially projecting stud, a terminal lug on said stud, conductors connected to said washer and said lug, insulating spacing means on said stud separating the ends of said conductors, and a two-piece moulded housing enclosing said switch and having adjacent openings in their meeting edges for leading out said conductors.

15. The combination with a metal envelope mercury switch of the class described having a pair of conductors connected to the envelope and to an electrode carried by and insulated from said envelope, of a housing for said switch comprising a first moulded part enclosing one end and the major lateral periphery of the envelope, and a second moulded part enclosing the other end of said envelope and having keying engagement at its edge with said first part, and individual openings in each part adjacent the meeting edges thereof whereby said conductors may be led out from said switch in any desired angular relation.

16. A contact lug retaining washer adapted to be compressed between the spun-over edge of a metal envelope and the ceramic insert in a mercury switch of the class described, comprising a washer-like ring having an integral radial projection provided at its free end with lateral projecting ears, said ears being bent over to form a conductor socket and said projection being bent over to dispose the axis of said socket in a plane substantially parallel to the plane of said washer.

17. In combination, a metallic switch envelope having a body portion and an enlarged end portion defining therebetween an annular shoulder, a ceramic insert in said end portion having its inner end seated against said shoulder to limit inward movement of said insert, an axially extending flange on the outer end of said insert spaced radially inwardly of the interior surface of the end portion of said envelope, an axial bore in said insert terminating at its outer end in successive annular shoulders, an electrode disc disposed within said flange and seating against one of said shoulders to limit inward movement thereof, and resilient sealing means having a disc-shaped portion engaging the outer faces of said electrode and flange and having a peripheral flange extending into the annular space between said end portion of said envelope and said flange of said insert.

18. In combination, a metallic switch envelope having a body portion and an enlarged end portion defining therebetween an annular shoulder, a ceramic insert in said end portion having its inner end seated against said shoulder to limit inward movement of said insert, an axially extending flange on the outer end of said insert spaced radially inwardly of the interior surface of the end portion of said envelope, an axial bore in said insert terminating at its outer end in successive annular shoulders, an electrode disc disposed within said flange and seating against one of said shoulders to limit inward movement thereof, resilient sealing means having a disc-shaped portion engaging the outer faces of said electrode and flange and having a peripheral flange extending into the annular space between said end portion of said envelope and said flange of said insert, and a relatively rigid insulating disc compressed against the outer radial face of said sealing means to produce axial and radial compression of said sealing means on said flange and electrode.

19. In combination, a metallic switch envelope having a body portion and an enlarged end portion defining therebetween an annular shoulder, a ceramic insert in said end portion having its inner end seated against said shoulder to limit inward movement of said insert, an axially extending flange on the outer end of said insert spaced radially inwardly of the interior surface of the end portion of said envelope, an axial bore in said insert terminating at its outer end in successive annular shoulders, an electrode disc disposed within said flange and seating against one of said shoulders to limit inward movement thereof, said disc having an axial thickness such that the outer radial face thereof is coplanar with the outer end of said flange, and resilient sealing means having a disc-shaped portion engaging the outer faces of said electrode and flange and having a peripheral flange extending into the annular space between said end portion of said envelope and said flange of said insert.

20. In combination, a metallic switch envelope having a body portion of square form and an enlarged cylindrical end defining therebetween a shoulder, a ceramic insert having its inner end seated against said shoulder, a frusto-pyramidal recess in said insert, means for aligning said insert with said envelope to maintain the defining surfaces of recess in register with the interior defining surfaces of said body portion, an electrode supported in said insert at the end of said recess removed from said body portion, and a body of mercury in said body portion and movable along the lower defining surface of said recess with an advancing edge extending normal to the direction of movement thereof toward and away from said electrode.

21. In a metallic envelope type of mercury switch, a ceramic insert having a frusto-pyramidal recess terminating at its small end in a rectangular radially offset groove, an axially extending annular flange on said insert disposed radially and axially outwardly of said groove, a disc-shaped electrode seating in said flange and forming one defining wall of said groove, a body of mercury in the lower side of said groove and projecting radially inwardly beyond the adjacent edge of the lower defining surface of said recess, and an axial recess in the face of said electrode receiving a portion of said mercury to increase the area of contact between said mercury and said electrode.

22. In combination, a metal envelope switch of the class described having a ceramic insert in one end thereof, sealing means for the outer end of said insert, a compression ring engaged by the spun over end of said envelope for pressing said sealing means against said insert, a contact lug washer held in position by said ring and in electrical engagement with said envelope, an electrode carried by said insert, a conductor connected to said washer, a conductor connected to said electrode, and a spacing insulator between said conductors and carried by said electrode.

23. In combination, a metal envelope mercury switch having a ceramic insert in one end thereof, compression means for holding said insert in position including a terminal lug washer in electrical engagement with said envelope, an electrode carried by said insert and having an axially projecting stud, a terminal lug on said stud, conductors connected to said washer and said lug, and spacing means on said stud separating the ends of said conductors.

24. In a metallic envelope type of mercury switch, a ceramic insert having a frusto-pyramidal bore extending axially therein and terminating at its smaller end in an acutely angled straight line transverse cutting edge extending the width of said smaller end, a radially outwardly extending wall defining said edge, an axial wall disposed at the outer end of said radial wall extending parallel to said edge, a second radially outwardly extending wall at the opposite end of said axial wall, and a planar disc-shaped electrode seating against said second radial wall and extending parallel to said first radial wall to define with said last-named wall and said axial wall a rectangular groove extending the full width of the smaller end of said recess.

25. A moulded insulating case for completely enclosing a mercury switch of the cup-shaped metallic envelope type having an axially projecting electrode shank, comprising a first case member conforming closely to the external surface of said envelope and enclosing the same, said member having an annular projection beyond the open end of said envelope, and a cap member closing the end of said first member and said shank having an annular peripheral shoulder seated in the end of said first member, said shoulder being notched at circumferentially spaced intervals and adapted to have any of its notched portions disposed in alinement with a lead wire notch formed in the projection of said first member.

26. A moulded insulating case for enclosing a mercury switch of the cup-shaped metal envelope type having an axially projecting electrode shank, with lead wires connected to the open end of said envelope and said shank, comprising a first case member conforming to and enclosing the external surface of said envelope and projecting axially beyond the end of said envelope, a cap member having a reduced annular portion projecting into the end of said first case member and having a radial shoulder abutting against the end thereof, and notches in said reduced portion accommodating passage of said lead wires therethrough.

27. In a mercury switch, a cup-shaped metal envelope, an electrode insulated from the envelope and having a shank projecting axially out of the open end of said envelope, a metallic ring encircling said shank and radially spaced therefrom, the end of said envelope being spun over the outer edge of said ring, a lead wire, means engaging said ring and forming terminal means to which said lead wire is secured, an insulating spacing member centered on said shank axially outwardly of said terminal means, a second lead wire and means on the outer face of said spacing member forming terminal means for connecting said second lead wire to said shank.

28. In a mercury switch, a cup-shaped metal envelope having an internal shoulder, a hollow ceramic insert located against said shoulder, an electrode supported in insulated relation in the open end of said envelope in abutment with the outer end of said ceramic and having an axially outwardly projecting shank insulating means holding the electrode in said abutting engagement with said ceramic, a metallic ring fitting within the open end of the envelope abutting the outer face of said insulating means and radially spaced from said shank, said end of said envelope being spun over said ring to locate said electrode against axial movement, lead wires for said envelope and said shank, an insulating disc on said shank outwardly of said spun-over end, and means on opposite sides of said disc forming terminal connections for said lead wires to said envelope and shank respectively.

29. In combination, a cup-shaped metallic envelope, insulating means in the open end thereof, an electrode centered in said insulating means and having an axially outwardly projecting shank, secondary insulating means about said shank outwardly of the electrode, a metallic ring fitting in the open end of the envelope and radially spaced from said shank, said envelope having a spun over edge engaging said ring for compressing said secondary insulating means axially against the outer face of said electrode to hold said electrode against axial outward movement, an insulating disc centered on said shank axially beyond said ring, lead wires for said envelope and shank, and means on opposite sides of said disc forming terminal connections for said lead wires to said envelope and shank respectively.

30. A terminal assembly for a metal envelope mercury switch having an axially projecting electrode shank, comprising an insulating spacing member on said shank, an insulating disc abutting the outer face of said member and of a diameter substantially greater than said spacing member, means on the envelope side of said disc forming a terminal connection between the envelope and a lead wire, and means on the opposite side of said disc forming a terminal connection between said shank and a second lead wire.

31. A terminal assembly for a metal envelope mercury switch having a metallic ring engaged by an outer spun-over end and having an axially projecting electrode shank out of contact with said ring, comprising means forming a terminal connection between said ring and a lead wire, means forming a terminal connection between said shank and a second lead wire, and insulating spacing means about said shank separating said terminal connection means.

32. A metal envelope mercury switch comprising a metallic shell open at one end, a ceramic insert in said end, an electrode centered in said insert and having an outwardly projecting shank, a resilient gasket about said shank engaging the outer radial faces of said electrode and insert, and rigid insulating means about said shank including a disc portion for exerting axial pressure against said gasket and a cylindrical portion outwardly thereof of reduced diameter radially insulating said shank from the end of said envelope.

33. A metal envelope mercury switch comprising a cup-shaped envelope shell having an open end, a ceramic insert in said end having an axial bore, an electrode disc closing said bore and seated in said insert so as to be radially insulated thereby from said shell, an outwardly projecting shank on said electrode, resilient sealing means about said shank engaging the radial outer faces of said disc and insert, rigid insulating means about the outer end of said shank including a disc portion and a reduced cylindrical portion disposed axially outwardly thereof, and means for imposing axial inward pressure on the disc portion to compress said sealing means, said cylindrical portion radially insulating said shank from the end of said shell.

PAUL S. BEAR.